(12) United States Patent
Hodzic (10) Patent No.: US 7,900,060 B2
(45) Date of Patent: Mar. 1, 2011

(54) METHOD AND SYSTEM FOR SECURING A DISK KEY

(75) Inventor: Edin Hodzic, Pleasanton, CA (US)

(73) Assignee: Vudu, Inc., Santa Clara, CA (US)

(*) Notice: Subject to any disclaimer, the term of this patent is extended or adjusted under 35 U.S.C. 154(b) by 1117 days.

(21) Appl. No.: 11/357,860

(22) Filed: Feb. 17, 2006

(65) Prior Publication Data

US 2009/0031143 A1 Jan. 29, 2009

(51) Int. Cl.
*G06F 11/30* (2006.01)
*G06F 7/04* (2006.01)

(52) U.S. Cl. .......................... 713/193; 726/21

(58) Field of Classification Search .......... 713/193; 726/21
See application file for complete search history.

(56) References Cited

U.S. PATENT DOCUMENTS

| | | | |
|---|---|---|---|
| 4,288,659 A | 9/1981 | Atalla | |
| 4,578,530 A | 3/1986 | Zeidler | |
| 5,410,343 A | 4/1995 | Coddington et al. | |
| 5,509,120 A | 4/1996 | Merkin et al. | |
| 5,748,732 A | 5/1998 | Le Berre et al. | |
| 5,949,881 A * | 9/1999 | Davis | 713/189 |
| 6,115,816 A * | 9/2000 | Davis | 713/153 |
| 6,263,504 B1 | 7/2001 | Ebisawa | |
| 6,289,455 B1 | 9/2001 | Kocher et al. | |
| 6,424,714 B1 | 7/2002 | Wasilewski et al. | |
| 6,625,729 B1 | 9/2003 | Angelo et al. | |
| 6,687,683 B1 * | 2/2004 | Harada et al. | 705/51 |
| 6,715,085 B2 * | 3/2004 | Foster et al. | 726/27 |
| 6,804,357 B1 | 10/2004 | Ikonen et al. | |
| 6,804,719 B1 | 10/2004 | Cabrera et al. | |
| 6,961,858 B2 | 11/2005 | Fransdonk | |
| 6,993,132 B2 | 1/2006 | Khandelwall et al. | |
| 7,003,672 B2 | 2/2006 | Angelo et al. | |
| 7,069,332 B2 | 6/2006 | Shibata et al. | |
| 7,134,138 B2 * | 11/2006 | Scherr | 726/2 |
| 7,168,065 B1 | 1/2007 | Naccache et al. | |
| 7,228,432 B2 * | 6/2007 | Angelo et al. | 713/182 |
| 7,240,345 B2 * | 7/2007 | Sueyoshi et al. | 717/161 |
| 7,380,276 B2 | 5/2008 | Saha et al. | |
| 7,440,574 B2 | 10/2008 | Hanks et al. | |
| 7,475,254 B2 * | 1/2009 | Craft | 713/187 |
| 7,496,756 B2 * | 2/2009 | Oka et al. | 713/175 |
| 2002/0112178 A1 * | 8/2002 | Scherr | 713/200 |
| 2002/0114465 A1 | 8/2002 | Shen-Orr et al. | |

(Continued)

OTHER PUBLICATIONS

Non-Final Office Action dated Sep. 1, 2009 for U.S. Appl. No. 11/558,872. 19 Pages.

(Continued)

*Primary Examiner*—Techane J Gergiso
(74) *Attorney, Agent, or Firm*—Mahamedi Paradice Kreisman LLP (57) ABSTRACT

In accordance with an embodiment of the present invention, a trusted client includes a non-volatile memory programmed with an encrypted disk key. The encrypted disk key in the non-volatile memory is encrypted with a master key of a security processor. Accordingly, encrypted data received by the central processor from a disk's security logic is forwarded to a security processor along with the encrypted disk key. The security processor decrypts the encrypted disk key and then decrypts the encrypted data, utilizing the disk key. The disk key is never available to the central processing unit in the clear.

14 Claims, 5 Drawing Sheets

U.S. PATENT DOCUMENTS

| | | |
|---|---|---|
| 2002/0154892 A1 | 10/2002 | Hoshen et al. |
| 2002/0184489 A1 | 12/2002 | Mraz |
| 2003/0084298 A1 | 5/2003 | Messerges et al. |
| 2003/0120923 A1* | 6/2003 | Gilman et al. ............... 713/170 |
| 2003/0208765 A1 | 11/2003 | Urdang et al. |
| 2004/0039911 A1* | 2/2004 | Oka et al. .................... 713/175 |
| 2004/0088558 A1 | 5/2004 | Candelore |
| 2004/0093507 A1 | 5/2004 | Courcambeck et al. |
| 2004/0148634 A1 | 7/2004 | Arsenault et al. |
| 2005/0108414 A1 | 5/2005 | Taylor et al. |
| 2005/0114659 A1* | 5/2005 | Klein .......................... 713/165 |
| 2005/0117747 A1 | 6/2005 | Valenti et al. |
| 2005/0135705 A1* | 6/2005 | Nishi .......................... 382/276 |
| 2005/0177853 A1 | 8/2005 | Williams et al. |
| 2006/0031537 A1 | 2/2006 | Boutboul et al. |
| 2006/0136597 A1 | 6/2006 | Shabtai et al. |
| 2006/0143476 A1* | 6/2006 | McGovern ................... 713/191 |
| 2006/0174004 A1 | 8/2006 | Asthana |
| 2006/0190615 A1 | 8/2006 | Panwar et al. |
| 2007/0016832 A1 | 1/2007 | Weiss |
| 2007/0101399 A1 | 5/2007 | Yun |
| 2008/0091840 A1 | 4/2008 | Guo et al. |
| 2008/0148323 A1 | 6/2008 | White et al. |
| 2008/0267406 A1 | 10/2008 | Asokan et al. |

OTHER PUBLICATIONS

Non-Final Office Action dated Aug. 14, 2009 for U.S. Appl. No. 11/413,392, 22 Pages.

Non-Final Office Action dated May 21, 2009 for U.S. Appl. No. 11/368,306, 16 Pages.

Non-Final Office Action dated Sep. 4, 2008 for U.S. Appl. No. 11/465,434, 14 Pages.

Final Office Action dated Apr. 1, 2010 for US Appl. No. 11/558,872 22 pages.

Final Office Action dated Apr. 15, 2010 for U.S. Appl. No. 11/413,392 24 pages.

Final Office Action dated Mar. 26, 2010 for U.S. Appl. No. 11/368,306. 15 pages.

Non-Final Office Action dated Oct. 26, 2010 for U.S. Appl. No. 11/368,306; 16 pages.

* cited by examiner

METHOD AND SYSTEM FOR SECURING A DISK KEY

TECHNICAL FIELD

The present invention relates generally to data security, and in particular, to a method and system for securing a disk key that is required to access a disk of a trusted client.

BACKGROUND

The Internet has shown great promise as a means for delivering digital content (e.g., video and audio content, such as television shows, movies and songs). One of the advantages of network-based digital content delivery systems is the ability to deliver digital content to users on an on-demand basis (e.g., video on demand, or VOD). However, content providers have been slow to make content available via the Internet, in large part because of security concerns. Specifically, content providers fear that, once their digital content is available on the Internet, hackers will circumvent any security mechanisms used to protect their digital content and then freely distribute the content. Consequently, system developers are continuously looking for ways to secure digital content and improve the systems by which digital content is delivered over computer networks.

One of the most common ways to protect digital content is to encrypt the digital content so that only a hardware device with access to the proper encryption key can "unlock" and play the digital content. However, this approach is dependent on the ability to secure the encryption key that is used to decrypt the digital content. If a hacker is able to discover the encryption key, then the hacker can use the encryption key to gain unauthorized access to the digital content. Moreover, often times the encryption key can be easily distributed to others so that anyone with the encryption key can gain unauthorized access to the digital content. Accordingly, great care must be taken to secure encryption keys.

One of the ways that hackers attempt to discover encryption keys is by analyzing the hardware and the software routines that operate on the digital content. If a hacker can gain access to a client's system software and/or application software, for example, then the hacker may be able to determine how the system is utilizing an encryption key. Ultimately, this may lead to the discovery of the encryption key. Consequently, it is preferable to prevent hackers from gaining access to system and application software that is stored on a trusted client's disk.

To that end, disk manufacturers have developed disks that can be "locked" with special encryption keys (e.g., disk keys). Accordingly, only a central processing unit with access to the proper disk key can be properly authenticated to gain access to the data on the disk. Among other advantages, this prevents a hacker from removing the disk from the client system, and utilizing the disk in a different system. Of course, the effectiveness of this approach is dependent upon preventing hackers from gaining access to the disk key.

SUMMARY OF THE DESCRIPTION

A method and system for securing a disk key are disclosed. According to one embodiment of the invention, a client device includes a central processing unit, a disk with security logic to "lock" the disk, a non-volatile memory storing an encrypted copy of the disk key for unlocking the disk, and a security processor with a master (encryption) key that is inaccessible to the central processing unit. Communications between the disk and the CPU are encrypted with the disk key of the disk. Accordingly, encrypted data received at the CPU is forwarded to the security processor, along with the encrypted copy of the disk key stored in the non-volatile memory. Consequently, cryptographic operations requiring access to the disk key are handled at the security processor, where the encrypted disk key can be decrypted with the security processor's master (encryption) key. This prevents the CPU from gaining access to the disk key in the clear.

Other objects, advantages and features of the present invention will become apparent upon examining the following detailed description of an embodiment thereof, taken in conjunction with the attached drawings.

BRIEF DESCRIPTION OF THE DRAWINGS

The invention will be readily understood by reviewing the following detailed description in conjunction with the accompanying drawings, in which like references indicate similar elements and in which.

DETAILED DESCRIPTION

A method and system for securing a disk key are described. In the following description, for purposes of explanation, numerous specific details are set forth in order to provide a thorough understanding of the present invention. It will be evident to one skilled in the art, however, that the present invention may be practiced without these specific details. The description and representation herein are the means used by those experienced or skilled in the art to effectively convey the substance of their work to others skilled in the art. In some instances, to avoid unnecessarily obscuring aspects of the present invention, well-known operations and components have not been described in detail.

Reference herein to "one embodiment" or "an embodiment" means that a particular feature, structure, operation, or other characteristic described in connection with the embodiment may be included in at least one implementation of the invention. However, the appearance of the phrase "in one embodiment" or the phrase "in an embodiment" in various places in the specification does not necessarily refer to the same embodiment.

In one embodiment of the present invention, a network-connected client device for receiving and presenting digital content to a user is disclosed. The client device includes a non-volatile memory, a central processing unit, a security processor, and a disk for storing software, as well as digital content (e.g., video and/or audio content). The disk includes security logic for authenticating the host (e.g., client device), and for providing cryptographic services to ensure secure communications between the host and the central processing unit.

For example, in one embodiment, the disk is "locked" with a disk key, such that, in order to access the disk, the client device must have access to the disk key. However, instead of storing the disk key in the clear (e.g., in an unencrypted form) in the client's non-volatile memory, the disk key is stored in the client's non-volatile memory in an encrypted form— encrypted with a master encryption key of the security processor. The master encryption key of the security processor is known only to the security processor, and is never accessible to the central processing unit. Therefore, the security processor can decrypt the encrypted disk key. Consequently, cryptographic operations requiring access to the disk key are performed by the security processor, and the central processing unit never has access to the disk key in the clear.

Figure 1:
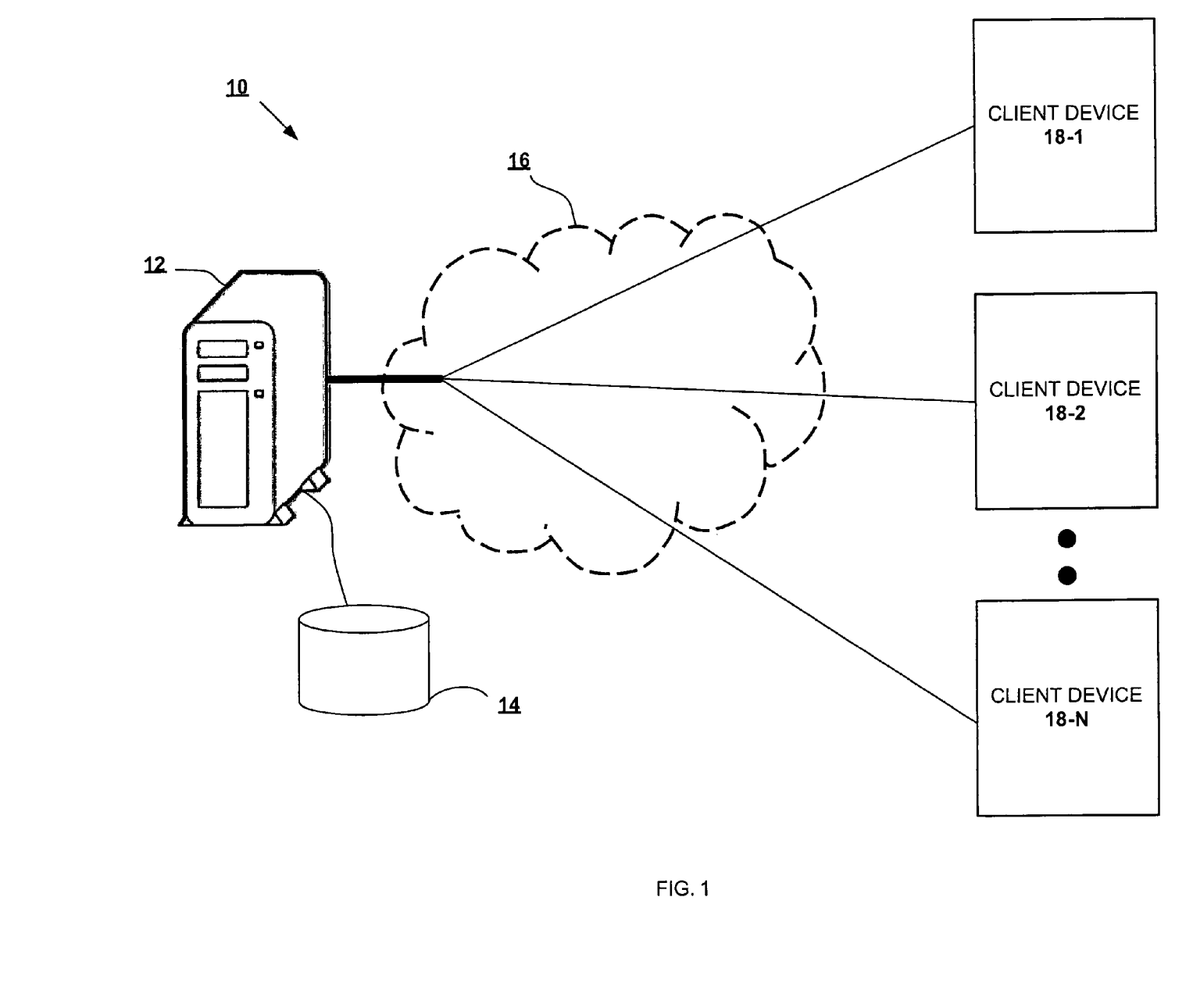
FIG. 1 illustrates a client-server based digital content delivery system, in which a client device according to an embodiment of the invention may be utilized.

FIG. 1 illustrates a client-server based digital content delivery system 10, in which a client device 18 according to an embodiment of the invention may be utilized. The digital content delivery system 10 of FIG. 1 includes a digital content server 12 with a mass storage device 14 for storing digital content. The digital content server 12 is coupled by means of a network 16 to multiple client devices 18-1, 18-2 and 18-n. In operation, a particular client device 18-1 may communicate a request for a particular title (e.g., movie), or other digital content, to the content server 12. In response, the content server 12 reads the digital content from the mass storage device 14, encrypts the digital content with an encryption key, and then communicates the digital content over the network 16 to the requesting client device 18-1. Upon receiving the encrypted digital content, the client device 18-1 executes a procedure for decrypting the digital content and then displaying the digital content to the user. However, as described in greater detail below, the process for decrypting and displaying the digital content, which prior to being executed is a software application initially stored on the client's disk, can only be accessed and executed by the client's central processing unit if the client is properly authenticated by the client's disk.

Figure 2:
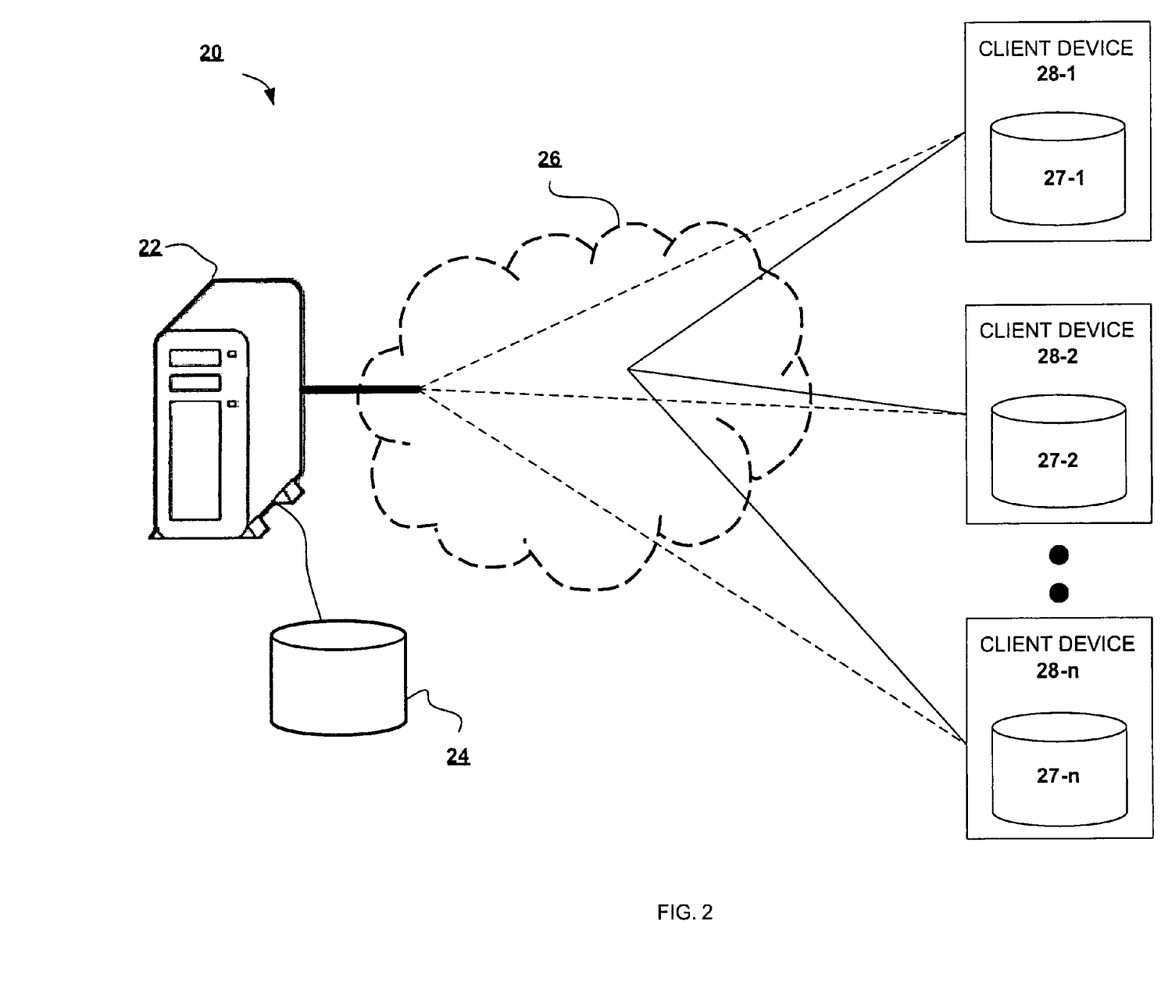
FIG. 2 illustrates a distributed digital content delivery system, in which a client device according to an embodiment of the invention may be utilized.

FIG. 2 illustrates a distributed digital content delivery system 20, in which a client device according to an embodiment of the invention may be utilized. In contrast to the client-server based system 10 of FIG. 1, the system of FIG. 2 is a distributed system. For example, the digital content is stored not only on the mass storage device 24 of the content server 22, but also on the storage devices 27-1, 27-2 and 27-n of each individual client device 28-1, 28-2 and 28-n. Consequently, when a particular client device 28-1 makes a request for a particular title, the digital content server 22 manages the delivery process, but the actual data is communicated to the requesting client 28-1 over the network 26 from other client devices (e.g., client devices 28-2 through 28-n). This distributed delivery system, which may be thought of as a hybrid of a client-server and peer-to-peer delivery system, is more completely described in U.S. patent application Ser. No. 11/269,462 filed on Nov. 7, 2005, and assigned to VVOND, Inc.

The content delivery systems illustrated in FIG. 1 and FIG. 2 are provided as two examples of systems in which the client device, according to an embodiment of the invention, may be utilized. However, it will be appreciated by those skilled in the art that the present invention may be applicable to a wide variety of client devices and content delivery systems in addition to those illustrated in FIG. 1 and FIG. 2. Furthermore, consistent with the invention, the client device may be implemented in one of many possible form factors, including (but not limited to): a set-top box, a handheld player, a mobile phone, a personal digital assistant, or a game playing device.

Figure 3:
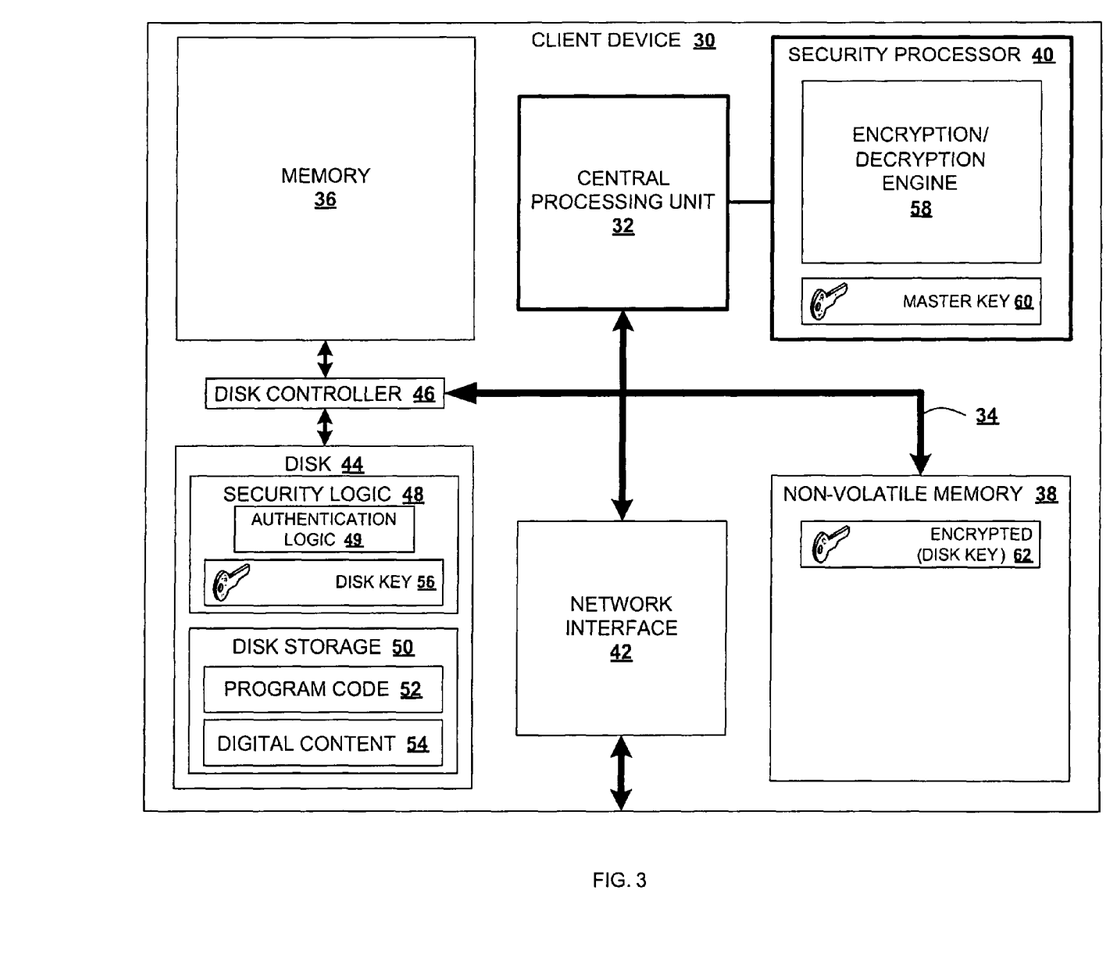
FIG. 3 illustrates a client device, according to one embodiment of the invention.

FIG. 3 illustrates a client device 30, according to one embodiment of the invention. As illustrated in FIG. 3, the client 30 includes a central processing unit (CPU) 32, coupled by means of a system bus 34 to a memory 36, a non-volatile memory 38, a security processor (or co-processor) 40, and a network interface 42. In addition, the CPU 32 is coupled to a disk 44 by means of a disk controller 46 and the system bus 34. It will be appreciated by those skilled in the art that the disk controller 46 and disk 44 may be connected via a standard interface (e.g., advanced technology attachments (ATA), serial ATA, small computer system interface (SCSI), iSCSI, universal serial bus (USB), IEEE 1394 (Firewire), etc.), and the disk 44 may be external or internal. Accordingly, the CPU 32 and disk 44 may communicate with commands from a command set associated with the standard interface by which they are connected. In addition, for certain operations (e.g., authentication and/or encryption operations) the CPU 32 and disk 44 may utilize commands from a proprietary command set extension provided by the manufacturer of the disk 44.

In one embodiment of the invention, one or more of the individual components shown in FIG. 3 may be part of a system-on-a-chip (SoC). For example, in one embodiment of the invention, the CPU 32, security processor 40, memory 36, and non-volatile memory 38 may all be part of a SoC. It will be appreciated by those skilled in the art that the client device 30 may include a variety of other functional components (e.g., a display subsystem and/or an additional communication component) that are not germane to the invention, and therefore have not been included in FIG. 3.

As illustrated in FIG. 3, the disk 44 includes security logic 48 and authentication logic 49, which together prevent an unauthorized CPU from gaining access to the data (e.g., program code 52 and digital content 54) in disk storage 50. The security logic 48, which may be implemented in hardware, software, or a combination thereof, includes a disk key 56 that is used for encrypting and decrypting messages (e.g., commands and/or data) communicated to and from the CPU 32. In one embodiment of the invention, the disk key 56 is implemented in hardware at the time the disk is manufactured. For example, the disk key 56 may be programmed into a non-volatile one-time programmable memory device included in, or accessible by, the security logic 48. Accordingly, each disk 44 may be delivered by the disk manufacturer with a copy of the pre-programmed disk key. As described in greater detail below, the copy of the disk key is necessary to enable the client 30 to gain access to the disk 44. If, for example, the disk 44 is removed from the client 30 and coupled to a different CPU, the disk 44 will not be accessible to that CPU unless it has access to a copy of the disk key 56.

In an alternative embodiment of the invention, the security logic 48 may have multiple disk keys. Accordingly, each disk key may have a different purpose. For example, in one embodiment of the invention, one disk key may be used for authentication operations in general, while one or more other disk keys may be used to encrypt and/or decrypt data (e.g., program code 52 and/or digital content 54) that is read from or written to disk storage 50. In one embodiment, for example, the disk storage 50 may be divided into different sections such that each section has its own disk key. Accordingly, data read from or written to a particular section of disk storage 50 may utilize the disk key associated with that particular section for encryption/decryption operations.

The authentication logic 49 provides a mechanism for associating the disk 44 with the client 30, such that the disk 44 is only accessible to an authenticated client. For example, the authentication logic 49 may implement an authentication protocol for authenticating the disk 44 to the client 30 and/or the client 30 to the disk. In one embodiment of the invention, the authentication protocol may be a simple password scheme.

Alternatively, the authentication protocol may be based on a challenge-response scheme. Accordingly, the disk key 56 of the disk, and the copy of the disk key 62 stored in the non-volatile memory 38 serve as the shared secret between the disk 44 and the CPU 32. However, the encrypted disk key 62 must be decrypted by the security processor 40 before it can be used as a shared secret in an authentication operation. This prevents the CPU 32 from gaining access to the disk key in the clear, which is desirable, because it provides a level of protection against a hacker attempting to identify the disk key 56 and gain access to the program code 52 or digital content 54 stored in disk storage 50.

Referring again to FIG. 3, the security processor 40 includes an encryption/decryption engine 58 and a master key 60. Accordingly, the security processor 40 may provide the client 30 with a wide variety of security functions or services. In one embodiment of the invention, the security processor 40 provides processing power for encryption/decryption tasks that are computationally intensive. For example, encrypted digital content received via the network interface 42 may be decrypted by the encryption/decryption engine 58, in real time, before being provided to the display subsystem (not shown) for display to a user. Accordingly, in various embodiments of the invention, the security processor 40 may have any number of secret keys in addition to the master key 60, and each key may serve a different purpose.

In one embodiment of the invention, the master key 60, and any other secret keys, of the security processor 40 are programmed into a non-volatile one-time programmable memory device at the time the security processor 40 is manufactured. Accordingly, like the disk key 56 of the disk 44, a copy of the master key 60 may be provided with the security processor 40. In one embodiment of the invention, the copy of the master key 60 of the security processor 40 is utilized to encrypt the copy of the disk key 56, resulting in an encrypted disk key 62. The encrypted disk key 62 is then programmed into the client's 30 non-volatile memory 38. Consequently, the CPU 32 will have access to the encrypted disk key, but will not have access to the disk key in the clear (e.g., an unencrypted disk key).

In one embodiment of the invention, the encrypted disk key 62 is utilized by the security processor 40 to encrypt and decrypt messages (e.g., commands and/or data) communicated between the disk 44 and the CPU 32. The messages, for example, may be associated with an authentication operation that is utilized to authenticate the disk 44 to the host (e.g., the CPU 32), or the host to the disk 44. Accordingly, in one embodiment of the invention, a message may include an authentication command communicated between the disk 44 and the CPU 32. In the case of a message from the disk 44 to the CPU 32, the command may be encrypted with the disk's disk key 56, and decrypted by the security processor using the disk key 62 stored in the non-volatile memory 62. In the case of a message from the CPU 32 to the disk 44, the command may be encrypted with the encrypted disk key 62 (e.g., after it has been decrypted by the security processor 40), and then decrypted with the disk key 56 of the disk 44.

Alternatively, a message may include a command and associated disk data. Accordingly, in one embodiment, only the disk data associated with the command may be encrypted. For example, in one embodiment of the invention, all disk data stored in disk storage 50 is encrypted with the disk key 56. Consequently, disk data read by the CPU 32 must be decrypted by the security processor 40 utilizing the encrypted disk key 62 stored in non-volatile memory 38. This prevents a hacker from utilizing a bus analyzer to gain unauthorized access to the disk data (e.g., program code 52 and/or digital content 54) when the disk data is communicated over the bus that connects the disk 44 to the disk controller 46.

Figure 4:
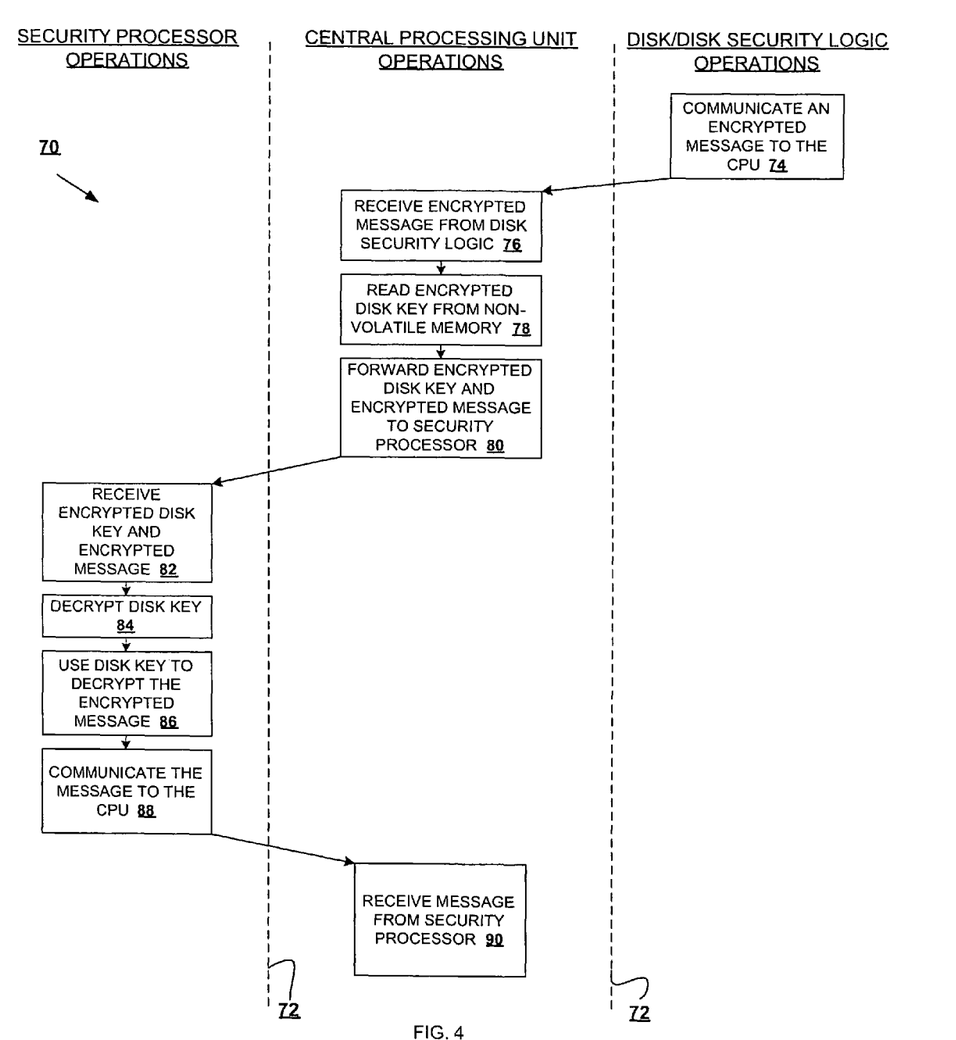
FIG. 4 illustrates a method, according to an embodiment of the invention, for decrypting an encrypted message with a secure disk key.

FIG. 4 illustrates a method 70, according to an embodiment of the invention, for decrypting an encrypted message received from the disk security logic 48. As illustrated in FIG. 4, the various operations of the security processor 40, CPU 32, and disk 44 (or, disk security logic 48) are separated by dotted lines 72. The method begins, at operation 74, when the disk 44 communicates an encrypted message to the CPU 32. For example, the encrypted message may represent disk data that is being communicated from the disk storage 50 to the CPU 32 in response to a previously issued read command.

At operation 76, the CPU 32 receives the encrypted message from the disk 44. Next, the CPU 32 reads the encrypted disk key 62 from non-volatile memory 38 at operation 78. At operation 80, the CPU 32 forwards the encrypted disk key 62 and the encrypted message to the security processor 40.

The security processor 40 receives the encrypted disk key 62 and the encrypted message at operation 82. Accordingly, the security processor decrypts the encrypted disk key 62 at operation 84. Next, at operation 86, the security processor uses the disk key to decrypt the encrypted message. Finally, the security processor communicates the message (in the clear) to the CPU 32 at operation 88. And, at operation 90, the CPU receives the message from the security processor 40.

It will be appreciated by those skilled in the art that the basic method illustrated in FIG. 4 can be reversed, such that data originating at the CPU 32 and destined for the disk 44 can be encrypted by the security processor 40 before being communicated from the CPU 32 to the disk 44.

Figure 5:
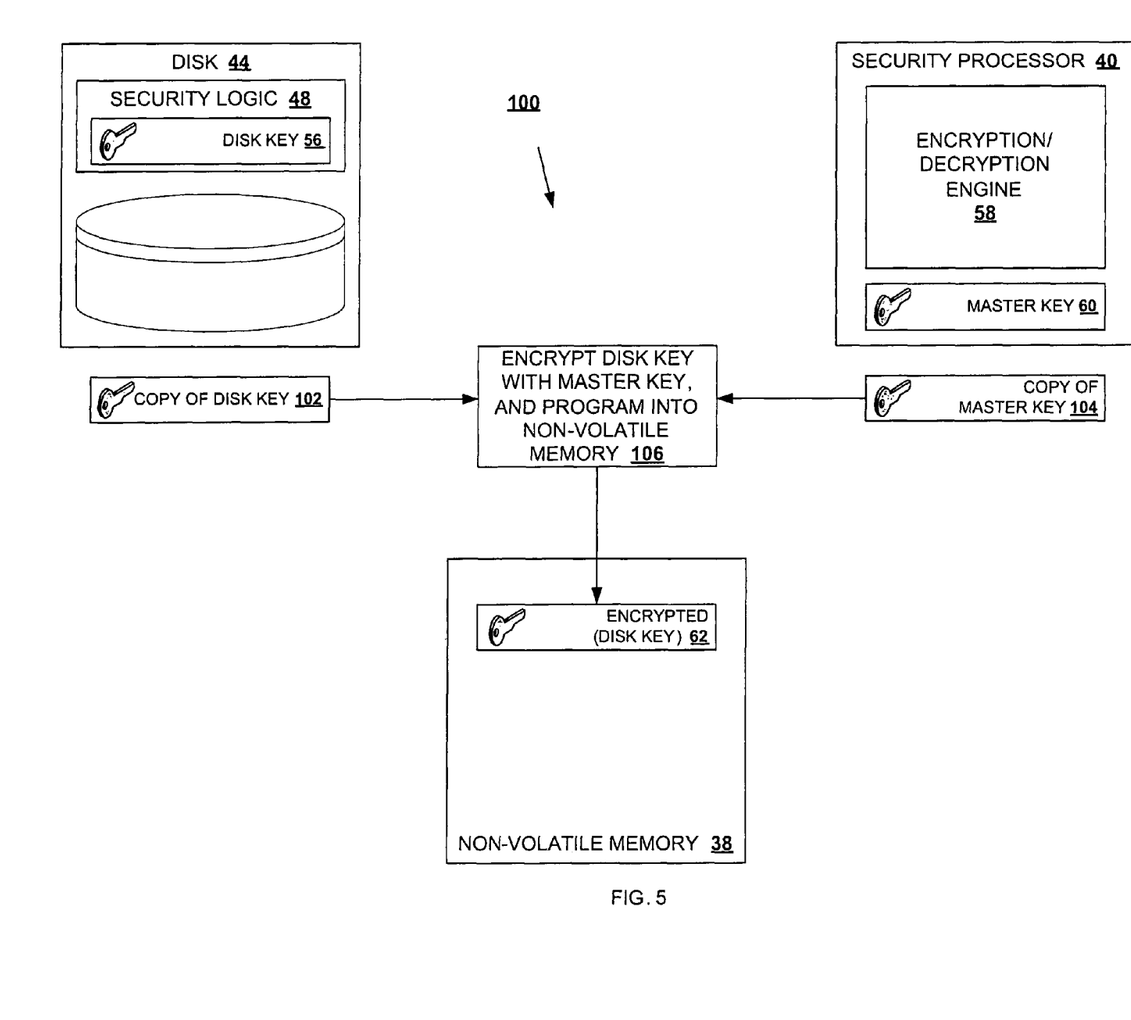
FIG. 5 illustrates a method, according to one embodiment of the invention, for securing a disk key.

FIG. 5 illustrates a method 100, according to one embodiment of the invention, for securing a disk key. As illustrated in FIG. 5, the method involves receiving a disk 44, which has a pre-programmed disk key 56 for "locking" the disk. In addition, a copy of the disk key 102 is received. A security processor 40 with a pre-programmed master key 60 is also received. And, a copy of the pre-programmed master key 104 is received. Next, at operation 106, the copy of the disk key 102 is encrypted with the copy of the master key 104, and then programmed into a non-volatile memory 38. Accordingly, a client device 30 with access to the encrypted disk key 62 and the security processor 40 will have the ability to decrypt the encrypted disk key, and perform cryptographic operations using such key on behalf of the host CPU 32 for the purpose of communicating encrypted data between the host CPU 32 and the disk 44.

The process of wrapping (encrypting) the disk key or disk keys (e.g., operation 106 in FIG. 5) with the master key may occur, for example, on a server during the manufacturing of the client device. In one embodiment of the invention, the disk key(s) received from the manufacturer of the disk may be re-programmed on a server, and then communicated to the client device, such that the new disk key(s) replace the pre-programmed disk key(s).

Thus, a method and system for deterring counterfeits have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus comprising:
   a central processing unit;
   a disk communicatively coupled to the central processing unit, the disk including security logic to prevent the central processing unit from accessing data on the disk until the central processing unit has been authenticated;

a non-volatile memory to store an encrypted disk key, encrypted with a master key of a security processor; and the security processor communicatively coupled to the central processing unit, the security processor including encryption/decryption logic, wherein the encryption/decryption logic is configured to i) receive the encrypted disk key stored in the non-volatile memory, ii) decrypt the encrypted disk key with the security processor's master key, and iii) utilize the disk key in an operation to authenticate the central processing unit, wherein the security processor is configured to i) receive an encrypted challenge from the disk security logic, ii) decrypt the encrypted challenge, and iii) encrypt a response communicated to the disk security logic;

wherein the disk is organized into one or more sections, and the security logic includes a disk key for each of the one or more sections, and wherein the disk key associated with a particular section is used to encrypt or decrypt data stored in that particular section; and wherein the disk grants access to data if the encrypted response matches a fixed-length character string generated by the security logic of the disk.

2. The apparatus of claim 1, wherein the disk key, after being decrypted by the security processor, is not available to the central processing unit.

3. The apparatus of claim 1, wherein the operation to authenticate the central processing unit includes utilizing the disk key to decrypt encrypted data received from the disk, the encrypted data received from the disk having been previously encrypted with the disk key.

4. The apparatus of claim 1, wherein the security processor includes a one-time programmable non-volatile memory, and the master key of the security processor is programmed into the one-time programmable non-volatile memory.

5. The apparatus of claim 4, wherein the master key of the security processor is one encryption key of a plurality of encryption keys programmed into the one-time programmable non-volatile memory.

6. The apparatus of claim 1, wherein the central processing unit, security processor and non-volatile memory are components of a system-on-a-chip.

7. The apparatus of claim 1, wherein the disk stores a client application for presenting on-demand video to a user, and data comprising the on-demand video is received by the client from other clients or a centralized content server.

8. The apparatus of claim 1, wherein the disk stores segments of media data for an on-demand video title utilized in a digital content delivery system that is based on a distributed architecture, wherein the client communicates the segments of media data to another client.

9. A computer-implemented method, comprising:

receiving, at a central processing unit (CPU), encrypted data from a disk, the data encrypted with a disk key;

reading an encrypted disk key from a non-volatile memory;

forwarding the encrypted disk key and the encrypted data from the CPU to a security processor, wherein the security processor is configured to i) receive an encrypted challenge from a security logic included in the disk, ii) decrypt the encrypted challenge, and iii) encrypt a response communicated to the security logic;

decrypting the encrypted disk key on the security processor;

utilizing the disk key to decrypt the encrypted data and granting access to the data if the encrypted response matches a fixed-length character string generated by the security logic;

wherein the disk is organized into one or more sections, and the security logic includes a disk key for each of the one or more sections, and wherein the disk key associated with a particular section is used to encrypt or decrypt data stored in that particular section.

10. The computer-implemented method of claim 9, wherein the encrypted data is communicated utilizing a command associated with a standardized communication protocol, or a command associated with proprietary extension to a standardized communication protocol.

11. A method for securing a disk key, the method comprising:

encrypting the disk key with an encryption key of a security processor, the disk key utilized by the disk in authentication operations for authenticating a processor requesting access to the disk, wherein the security processor is configured to i) receive an encrypted challenge from a security logic included in the disk, ii) decrypt the encrypted challenge, and iii) encrypt a response communicated to the security logic;

programming a non-volatile memory to store the disk key after the disk key has been encrypted with the encryption key of the security processor; and providing instructions to a central processing unit to forward encrypted data received from the disk to the security processor along with the encrypted disk key; and granting access to data on the disk if the encrypted response matches a fixed-length character string generated by the security logic;

wherein the disk is organized into one or more sections, and the security logic includes a disk key for each of the one or more sections, and wherein the disk key associated with a particular section is used to encrypt or decrypt data stored in that particular section.

12. The method of claim 11, further comprising:

providing instructions to the security processor to decrypt the disk key with the encryption key of the security processor, and to decrypt the encrypted data utilizing the decrypted disk key.

13. The method of claim 11, further comprising:

prior to encrypting the disk with an encryption key of a security processor, receiving a security processor with an embedded encryption key and a copy of the encryption key.

14. The method of claim 13, further comprising:

prior to encrypting the disk key with a master key of a security processor, receiving a disk with a pre-programmed disk key and a copy of the preprogrammed disk key, wherein the copy of the disk key is encrypted with the copy of the master key and then programmed into the non-volatile memory.

* * * * *